March 2, 1965 A. H. RICE ETAL 3,171,800
PROCESS FOR REMOVING IRON AND MANGANESE FROM WATER
Filed Oct. 23, 1962 2 Sheets-Sheet 1

ARCHIE H. RICE
RUSSELL L. CULP
INVENTORS.

BY
BUCKHORN, BLORE, KLARQUIST & SPARKMAN
ATTORNEYS

United States Patent Office 3,171,800
Patented Mar. 2, 1965

3,171,800
PROCESS FOR REMOVING IRON AND
MANGANESE FROM WATER
Archie H. Rice and Russell L. Culp, Corvallis, Oreg., assignors to General Services Company, a corporation of Oregon
Filed Oct. 23, 1962, Ser. No. 232,514
3 Claims. (Cl. 210—52)

The present invention relates to a process for removal of dissolved and suspended iron and manganese values from domestic, municipal, industrial and other water supplies.

Soluble iron and manganese values are often present both in ground and surface waters. Concentrations of iron and manganese in excess of 0.3 part per million will discolor water, stain laundry and plumbing fixtures, stimulate the growth of certain slime organisms in pipe lines, and be objectionable in other ways.

With the present state of the art of water purification, removal of iron and manganese values is difficult and expensive. Because of this many potentially useful sources of water supply are undeveloped, and many iron and manganese bearing waters are used without treatment with unsatisfactory results.

It is, therefore, an object of the present invention to provide a more efficient, practical and economical method for removing iron and manganese values from water.

Another object is to provide a process enabling iron and manganese removal at faster flow rates than heretofore possible, thus reducing required plant size.

Still another object is to provide a process which will not require flocculation or sedimentation facilities.

It is a further object of the present invention to provide a process which will produce water essentially free of iron and manganese.

Still another object is to provide an improved method of determining the amounts of treating materials to add in treatment of waters containing iron and manganese.

Other objects and advantages will become apparent from the following description of the invention.

Our invention resides in the discovery that iron and manganese values may be removed effectively from water by adding to such waters and oxidizing agent and a polyelectrolyte or conditioning agent and passing such treated water immediately and without prior settling through filter media constructed of granular material sized and arranged so that the flow is always from an area of larger to smaller grain size. Our novel method of determining the amounts of such materials to be added will be described in detail hereinafter.

The invention will be further described in detail and illustrated in the accompanying drawings wherein.

Figure 1:
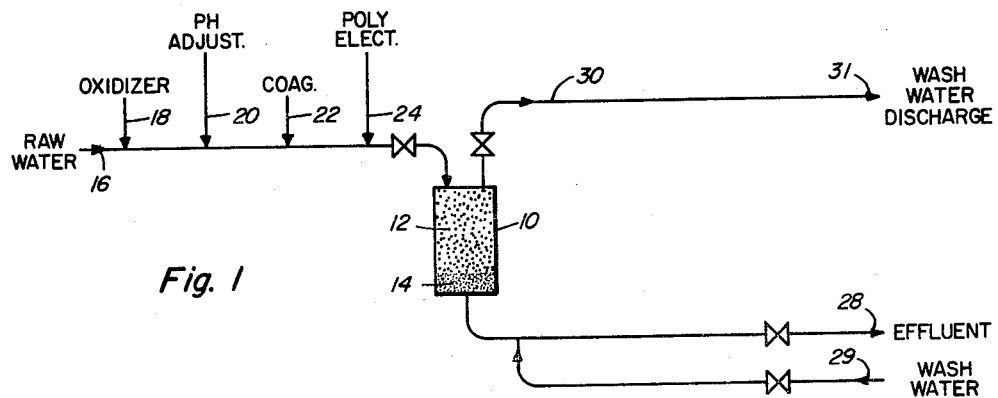
FIG. 1 is a flow diagram illustrating the application of our process to treatment of water in a treatment plant.

For the purpose of this application the following terms are defined as follows:

(1) *Oxidizing agent.*—A material capable upon addition to water of changing or oxidizing soluble forms of iron and manganese, ferrous and manganous, to insoluble forms, namely, ferric and manganic.

(2) *Coagulant.*—A material capable upon addition to water of producing a floc.

(3) *Polyelectrolyte or conditioning agent.*—Generic terms used to describe both naturally occuring biocolloids and synthetic compounds containing recurring units of small molecular weight chemically combined to form a molecule of large size. These agents are generally organic and are characterized by an inert carbon or silicon skeleton having attached thereto a large number of water-compatible groups such as hydroxyl, amine, amide or carboxyl groups. Included in this class of compounds are polysaccharides, polyacrylamides and acrylamide polymer hydrolytes. Other suitable materials include carboxymethylcelluloses, guar gums, the alginates, activated silica, ammonium lignosulfonates and similar substances. Because these compounds have the characteristics of both polymers and electrolytes, they are called polymeric electrolytes or polyelectrolytes. Based on the electrical charge which they carry, they are classified as anionic, cationic or nonionic.

Under many conditions, existing processes for removal of iron and manganese are economically impractical because of the short filter runs obtained, the high cost of operation and the high cost of the capital facilities necessary for the relatively low rate filters used. We have discovered that with the addition of an oxidizing agent and polyelectrolyte to the water and passage through a separation bed constructed of granular material with the grain size so arranged that the water in passing through the separation bed always flows from an area of larger to an area of smaller grain size, much more effective clarification is obtained and large quantities of precipitated iron and manganese solids can be stored within the interstices between the separation bed granules, thus permitting a long period of operation before cleaning of the bed is necessary and which may be accomplished by backflushing.

A "separation bed" within the meaning of the term used herein may comprise a single multi media bed or a number of beds of differently sized media with flow from the bed of larger particles to the bed of smaller particles.

Treatment in accordance with our process is as follows:

(1) Add sufficient oxidizing agent to react with the dissolved iron and manganese in the water.

(2) If necessary, adjust the pH of the water to bring it within the optimum range of producing a floc when a coagulant is to be used. Under most conditions a coagulant is not required with the use of this process, and no pH adjustment is required.

(3) Add to the water only sufficient coagulant to produce a floc which is removable in a separation bed. This will be a considerably lower coagulant dosage than that necessary to produce a satisfactorily settleable floc. Mix the coagulant uniformly throughout the water. In most applications this step can be omitted.

(4) Depending upon the water temperature and the amount of organic matter which may be present in the water being treated, allow a contact time between oxidizing agent and water (and also the coagulant when used and water) of from 1 minute to 3 hours prior to passing through a separation bed.

(5) Pass the water through a separation bed, adding to it, within 5 minutes prior to the time it enters the separation bed, a cationic, anionic, or nonionic polyelectrolyte.

Oxidizing agents which may be used with our process include air, chlorine, potassium permanganate, chlorine dioxide, ozone and other substances with similar properties. Air and chlorine are relatively inexpensive but generally slower acting as compared, say, to potassium permanganate and chlorine dioxide. Oxidizing agents may be used singly in the process, or in combinations of two or more. For example, an initial application of chlorine may be followed by a dose of potassium permanganate. This procedure utilizes the less expensive materials for reaction with readily oxidizable iron and manganese compounds, and reduces the quantity of the more expensive, faster-acting chemicals which may be required for removal of the remaining organic complexes of iron and manganese which are more difficult to oxidize.

When a coagulant is required, the optimum pH to obtain the best results will vary somewhat depending upon the coagulant used and the nature of the water being treated. Experience is necessary with a particular water to determine the preferred range. In general the pH should range between about 6.5 to 8.5. To adjust the pH to the desired range, bases such as soda ash, caustic soda, or lime may be utilized.

The amount of coagulant (normally a bivalent or trivalent metallic acid salt such as aluminum sulphate, copper sulphate, ferric chloride, ferric sulphate, or ferrous sulphate) will depend upon the characteristics of the water. Within very general limits, the coagulant dosage will vary from 5 to 60 p.p.m. Coagulant ordinarily will be required only if the water being treated is turbid.

Separation beds can be successfully operated at flow rates up to 15 gallons per minute (g.p.m.) per square foot. However, at flow rates above 2.0 g.p.m. per square foot, the solids held in the separation bed will have a tendency to break loose and pass through the bed unless the ability of the solids to stay in the bed is increased by the addition of a conditioning agent comprising a polyelectrolyte to the water not over a few minutes before the water enters the separation bed.

Referring to FIG. 1 for the moment, in one embodiment of the invention the separation bed 10 comprises an upper layer 12 of a coarse filter media and a lower layer 14 of a finer filter media. The upper layer is preferably of a particle size between about −8 +20 U.S. Sieve size while the lower layer is preferably between about −30 +40 U.S. Sieve size, though in some instances a finer media may be desired. Preferably also the material of the upper layer is of lower density than the material of the lower layer. A suitable material for the upper layer 12 is crushed anthracite coal while that of the lower layer 14 may be silica sand. The coarse layer 12 should have a vertical length of 18 inches or greater, preferably between about 24 inches to 30 inches, while the fine layer 14 may be of lesser length, say from 3 to 12 inches. The longer length of the coarse layer provides sufficient time for the action of the polyelectrolyte to be completed and for the coarse floc to be caught in the coarse particles. The finer sand serves to retain the finer floc which may pass through the coarse layer.

In the preparation of the bed, it is extremely important that as many fine granules as possible be removed from all but the finest layer. Fine material left in the coarser layers of granules will accumulate at the layer surface and effectively destroy the ability of that layer to pass the water without excessive head loss.

The amount of polyelectrolyte required will normally be less than 0.5 part of polyelectrolyte per million parts by weight of water. The actual amount of polyelectrolyte required is primarily a function of the water temperature, viscosity, and the rate of flow through the separation bed. It is slightly affected by the concentration of solids to be removed. It is measurably affected by the time between the addition of the oxidizing agent and coagulant and the addition of the polyelectrolyte, and by the time between the addition of the polyelectrolyte and that time when the water enters the separation bed.

The required polyelectrolyte dosage will vary inversely as a function of the water temperature, directly as a function of the viscosity, inversely as a function of the flow rate through the separation bed, and inversely as the time between the addition of the oxidizing agent and coagulant. The addition of the polyelectrolyte appears to increase the structural strength of the floc and its power to adhere to the particles of the bed. If the polyelectrolyte is added too long a time prior to filtering, its power of adhesion is diminished. It is theorized that this is because the "sticky" surfaces of the polyelectrolyte become coated with the oxidation products or the hydrate of the coagulant thus interfering with the adhesive quality of the polyelectrolyte. We have found that best results are obtained if the polyelectrolyte is added not over five minutes prior to the time filtering. We have also found that it may be added in a single step, or, in the case of separated beds of sized media, stepwise, by addition of some polyelectrolyte before the first bed and additional amounts between the beds.

The type of polyelectrolyte to be used, i.e., whether anionic, cationic, or nonionic will depend upon the character of the solids to be removed. It has been discovered that by the proper selection of the polyelectrolyte, not only can colloidal and larger size solids be held in the separation bed, but also many solids in true solution can be removed from the water and held in the separation bed.

An effective polymer is one sold under the trademark Separan NP–10, by the Dow Chemical Company. This material is reported to have a molecular weight of approximately one million and is represented by the formula:

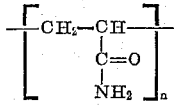

Separan NP–10 is formed by the polymerization of acrylamide. Because of the preponderance of amide groups, the polyacrylamide is essentially nonionic in solution although a small amount of the amide groups are usually hydrolyzed to anionic carboxyl groupings. It is a white, free flowing, amorphous solid with a bulk density of 0.55 gram per cubic centimeter. It softens at 220–230° C. and decomposition is evident at 270° C. It is rapidly wetted by water and is soluble in water in all proportions.

Other suitable polyelectrolytes include Nalco 110, manufactured by the Nalco Company and Separan AP–30, a product of Dow Chemical Company.

To determine the amount of polyelectrolyte required, an excess of polyelectrolyte (more than 0.5 p.p.m.) is added to the water to be treated and the water passed through the separation bed. Preferably the polyelectrolyte is added as a dilute aqueous solution containing less than 0.5 percent polyelectrolyte by weight and preferably about 0.1 percent. The dosages of oxidant and coagulant are adjusted to a minimum such that any further decrease makes it impossible to obtain a clear, iron and manganese free effluent from the separation bed at a flow rate equal to the intended operational rate of the bed. Then, holding the flow rate steady, the amount of polyelectrolyte is decreased until an iron, manganese, or turbidity break-through occurs in the separation bed. The polyelectrolyte is then increased until a satisfactory effluent is obtained and filtration continued until turbidity appears in the effluent indicating saturation of the separation bed. At that time the separation bed is cleansed by backflushing the same. Ordinarily between about 0.1 to 0.3 p.p.m. of a polyacrylamide such as Separan NP–10 will give satisfactory results.

The rate of flow necessary to backflush the separation bed is from 10 g.p.m. per square foot to 20 g.p.m. per square foot. Purified water preferably is used for backflushing. The actual backflushing rate will depend upon the size and density of the granules in the separation bed and the specific gravity and viscosity of the backflushing liquid. To assure that the separation bed does not hydraulically regrade during backflushing, it is necessary that the bed be constructed either as two or more separate units containing different sizes of granules or that materials of different densities be used when more than one general size of granule is used in a single bed. When a dual media bed is used, the granules of largest size must have the lowest density and the particles of smallest size must have the highest density.

*Example*

Extensive tests have been conducted on treatment of water from one of the wells (Well No. 8) owned by the Peoria Water Works Company at Peoria, Illinois, which comprises a part of the water supply system serving the city. The raw water pumped from this well contains about 1.6 p.p.m. of iron and 0.5 p.p.m. of manganese.

The separation bed was constructed of a 6-inch depth of quartz sand having a specific gravity of about 2.65 supported on graded gravel and overlaid with 18 inches of anthracite coal having a specific gravity of about 1.55. The sand was sized so that it passed a U.S 30-mesh sieve and was retained on a 40-mesh sieve. The coal was sized so that it passed a U.S. 16-mesh sieve and was retained on a U.S. 20-mesh sieve.

The raw water was pumped to a contact tank which provided a detention period of approximately 10 minutes before the water entered the separation bed. Chlorine was added to the water at the rate of 3.0 p.p.m. as it entered the contact tank. As the water entered the separation bed, potassium permanganate was added at the rate of 1.5 p.p.m., and polyacrylamide (Separan NP-10) was added at the rate of 0.2 p.p.m. The flow through the separation bed was maintained at a constant controlled rate of 6.0 g.p.m. per square foot of bed surface area. The separation bed operation followed the typical operating curves shown in FIG. 6. The total maximum iron and manganese content of the treated water was less than 0.05 p.p.m. The turbidity of the separation bed effluent varied from 0.03 to 0.20 standard unit.

Further tests were conducted at separation bed flow rates of 8.0 g.p.m. per square foot. The only effect of the increase in flow rate was to shorten the time before a breakthrough of iron, manganese, or turbidity occurred.

It is possible to use several flow diagrams incorporating the features outlined above. These will now be described, referring to the accompanying drawings.

Referring to FIG. 1, water enters the purification plant at 16. An oxidizing agent is added at 18. A coagulant and pH control chemicals, if necessary, are applied at 20 and 22, respectively. A polyelectrolyte is added at 24 just as the water enters the separation bed 10. The effluent from the separation bed is discharged through line 28. When the separation bed 10 requires backflushing, this is accomplished by passing purified water through line 29 up through separation bed 10. The flushing water then flows through line 30 to a lagoon 31 or other disposal.

Figure 2:
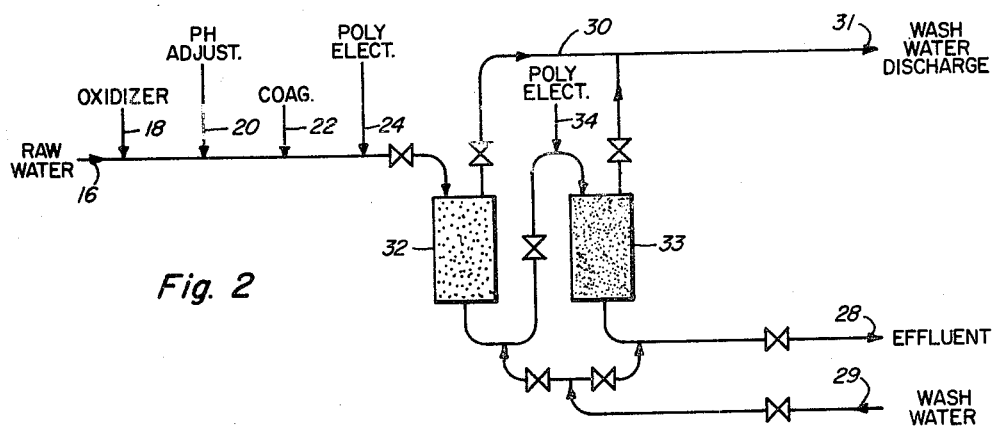
FIG. 2 is a modification of the flow diagram shown in FIG. 1.

The system of FIG. 2 is similar to FIG. 1, except that a pair of beds 32, 33 is used, the former of which contains large particles, the latter smaller particles. Polyelectrolyte may be added stepwise by adding a portion at 24 ahead of bed 32, and the remainder added at 34 between the beds. In some instances improved results may be obtained by adding additional oxidizing agent to the water between the beds 32, 34.

Figure 3:
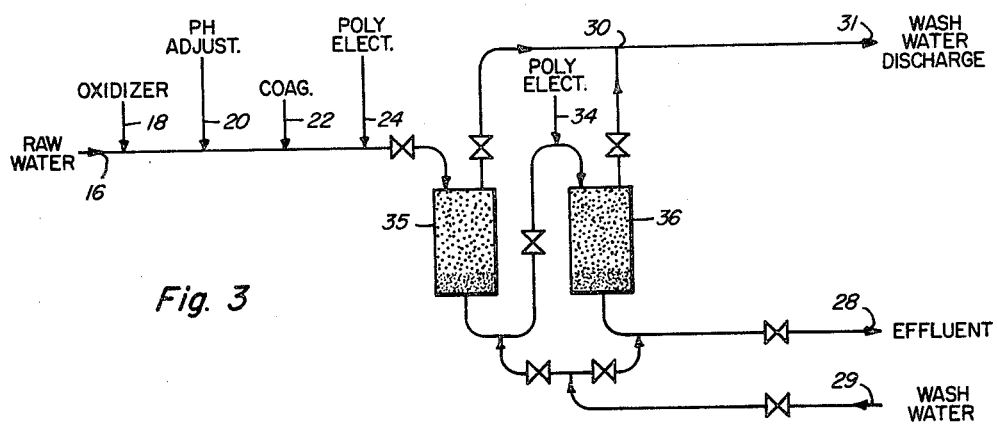
FIGS. 3 and 4 are flow diagrams of other methods of employing our invention.

FIG. 3 is similar to FIG. 1 except that two separation beds 35 and 36 are used in series, each of the beds containing both the large and small particles. Stepwise addition of polyelectrolyte may be practiced by application at 24 and 34.

Figure 4:
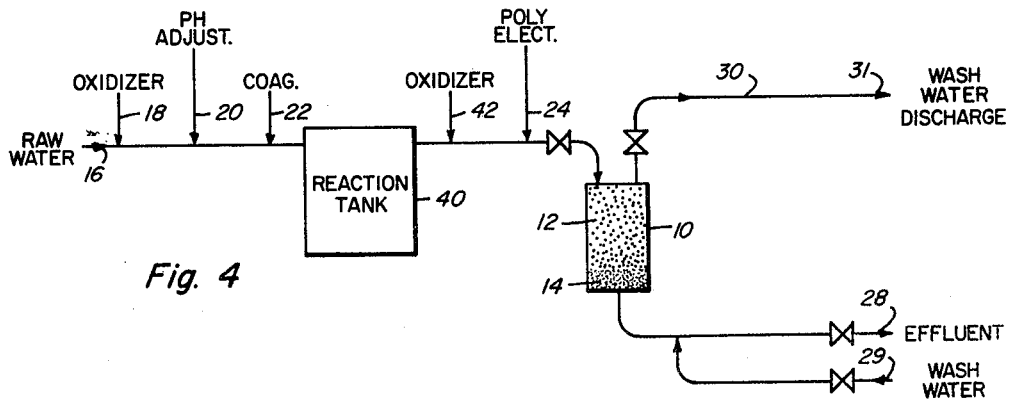

FIG. 4 is similar to FIG. 1 except that a reaction tank 40 has been added to the flow diagram. The retention capacity of this tank may vary from 1 minute to 3 hours depending upon the requirements of the particular water to be treated. With this arrangement the oxidizing agent or agents may be added stepwise at 22 and 42. The usual practice in this case would be to add a comparatively inexpensive oxidizing agent such as air or chlorine at 12, and a second faster-acting agent such as potassium permanganate or chlorine dioxide at 42.

Figure 5:
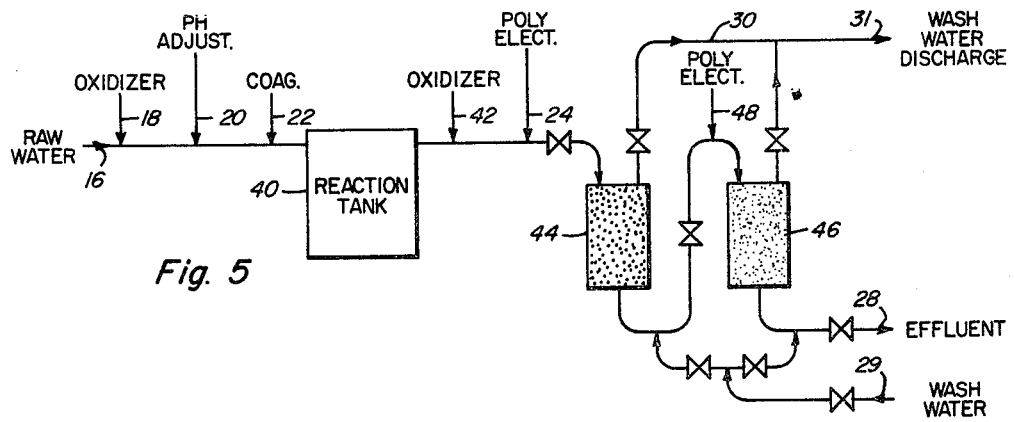
FIG. 5 is a modification of the flow diagrams shown in FIG. 4.

The system of FIG. 5 is similar to FIG. 4, except that a pair of beds 44, 46 is used, bed 44 containing large particles, bed 46 smaller particles. Polyelectrolyte may be added stepwise by adding a portion at 24 ahead of bed 44 and the remainder at 48 between the beds.

It will be observed that none of these systems include the usual flocculation or sedimentation facilities, thus reducing capital requirements and permitting faster through flow.

Figure 6:
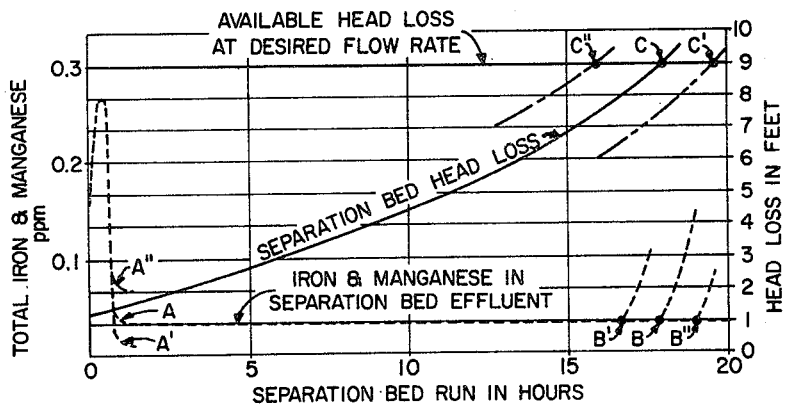
FIG. 6 is a graph illustrating certain operating characteristics of a system incorporating our invention.

The amount of the required oxidant, coagulant, and polyelectrolyte dosage is determined by monitoring the iron and manganese content and the turbidity of the separation bed effluent, and by determining the amount of head loss through the bed. FIG. 6 shows the typical operating characteristics of the process. Point A on the separation bed effluent curve for total iron and manganese content represents a minimum value reached during an operating cycle between backflushings. The amount of this residual for a given water, separation bed and plant flow diagram is dependent primarily upon the oxidant dosage. An increase in oxidant dosage will lower the iron and manganese in the effluent toward some point A' and a decrease in dosage will increase it toward point A''. For each flow diagram, separation bed and water there is a value above which the control becomes unstable. Point B represents a point at which an iron and manganese breakthrough occurs. This point is controlled by the polyelectrolyte dosage. At a given flow rate, an increase in polyelectrolyte dosage will move B toward B''. A decrease in polyelectrolyte dosage will move B toward B'. Point C represents the point where the actual head loss through the separation bed equals the available or maximum desirable head loss through the separation bed. A decrease in polyelectrolyte dosage will move C toward C' and an increase will move C toward C''.

In actual operation, a maximum desired concentration of iron and manganese in the separation bed effluent is selected and the oxidant dosage is adjusted to produce the selected value. The amount of polyelectrolyte added to the separation bed is adjusted so that points B and C are reached at the same time. When this condition is achieved, the separation bed is operating at maximum efficiency.

The separation bed, because of the relatively fine particulate nature of its media, often can remove the oxidized iron and manganese particles from the water without the use of a coagulant. If, under certain conditions, such removal is not sufficient to produce a satisfactory effluent then a coagulant may be required.

When a coagulant is used, measurements of turbidity in the effluent water can be used to control the coagulant dosage in a manner similar to that just described for control of the oxidant dosage by measurement of the iron and manganese content of the treated water. The shape of a curve for separation bed effluent turbidity would be much like that shown in FIG. 6 for iron and manganese content, except that the numerical values would differ.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. The method of removing iron and manganese values from water which consists of adding to such water an oxidizing agent and adding a polyelectrolyte to said water and within five minutes and without prior removal of resulting precipitates passing said waters through a separation bed comprising particles grading from coarse to fine in the direction of flow therethrough, said coarse particles being between about 8 to 20 mesh, said fine particles being less than about 30 mesh.

2. The method of removing iron and manganese values from water which consists of adding to said water an oxidizing agent in amount sufficient to oxidize said iron and manganese values to the ferric and manganic state respectively, adding to said water about 0.2 p.p.m. by weight polyacrylamide, and substantially immediately thereafter and without prior removal of resulting precipitates passing said water first through a layer of coarse particles of between about 8 to 20 mesh having a length of at least about eighteen inches and a layer of fine particles of between about 30 to 40 mesh having a length of about six inches.

3. The method of controlling the removal of iron and manganese values from water which comprises
    adding an amount in excess of 0.5 p.p.m. of a polyelectrolyte to the same,
    and without prior removal of resulting precipitates passing said water through a filter bed grading from coarse to fine particles in the direction of flow at a flow rate equal to the intended operational rate of the bed, said coarse particles being between about 8 to 20 mesh, said fine particles being less than about 30 mesh,
    adding to said water prior to passing through said filter bed just a sufficient amount of an oxidizing agent to obtain an effluent substantially free of insoluble iron and manganese compounds,
    as filtration continues decreasing the amount of polyelectrolyte until insoluble iron and manganese compounds appear in the effluent,
    thereafter increasing the amount of polyelectrolyte added to said water until a satisfactory effluent free of insoluble iron and manganese is obtained
and continuing the filtration of said water adding thereto the oxidizing agent and polyelectrolyte at the rates so determined.

References Cited by the Examiner

Text Program for Filter Evaluation at Hanford, Conley et al., Jour. AWWA, February 1960, vol. 52, pp. 205–218.

Manganese Removal by Oxidation With Potassium Permanganate, Adams, Jour. AWWA, February 1960, vol. 52, pp. 219–228.

Innovations in Water Clarification, Conley et al., Jour. AWWA, October 1960, vol. 52, pp. 1319–1325.

Significance and Removal of Manganese in Water Supplies, Griffin, Jour. AWWA, October 1960, vol. 52, pp. 1326–1334.

Iron and Manganese Removal Using $KMnO_4$, Humphrey et al., Water and Sewage Works, Reference Number, 1962, pp. R–176 to R–180, vol. 109, presentation date of March 1962 relied on.

Experience With Anthracite—Sand Filters, Conley, Jour. AWWA, December 1961, vol. 53, pp. 1473–1483.

MORRIS O. WOLK, *Primary Examiner.*